(12) United States Patent
Huo

(10) Patent No.: US 8,311,304 B2
(45) Date of Patent: Nov. 13, 2012

(54) COMPUTER-AIDED TUBING DETECTION

(75) Inventor: Zhimin Huo, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 13/296,296

(22) Filed: Nov. 15, 2011

(65) Prior Publication Data
US 2012/0057772 A1 Mar. 8, 2012

Related U.S. Application Data

(63) Continuation of application No. 12/172,283, filed on Jul. 14, 2008, now Pat. No. 8,064,675.

(60) Provisional application No. 61/024,624, filed on Jan. 30, 2008.

(51) Int. Cl.
*A61M 25/095* (2006.01)
(52) U.S. Cl. ......... 382/128; 382/130; 600/433
(58) Field of Classification Search ........... 382/128, 382/130, 132; 600/433, 434
See application file for complete search history.

(56) References Cited

U.S. PATENT DOCUMENTS

| | | | | |
|---|---|---|---|---|
| 6,047,080 | A * | 4/2000 | Chen et al. | 382/128 |
| 6,370,421 | B1 * | 4/2002 | Williams et al. | 600/433 |
| 6,690,816 | B2 | 2/2004 | Aylward et al. | |
| 6,817,982 | B2 * | 11/2004 | Fritz et al. | 600/443 |
| 7,116,810 | B2 | 10/2006 | Miller et al. | |
| 7,197,170 | B2 * | 3/2007 | Dwyer et al. | 382/128 |
| 7,611,466 | B2 * | 11/2009 | Chalana et al. | 600/443 |
| 7,706,859 | B2 * | 4/2010 | Aizawa et al. | 600/424 |
| 7,840,055 | B2 | 11/2010 | Huo | |
| 8,064,675 | B2 * | 11/2011 | Huo | 382/132 |
| 2007/0071301 | A1 | 3/2007 | Kiraly et al. | |

FOREIGN PATENT DOCUMENTS

WO WO 2008/063604 5/2008

OTHER PUBLICATIONS

Zhimin Huo, et al., "Computer-Aided Detection of Tubes and Lines in Portable Chest X-Ray Images," Computer Assisted Radiology and Surgery (CARS)m Jun. 27, 2007-Jun. 30, 2007, pp. S370-S372, XP002526333.

Subhasis Chaudhuri, et al., "Detection of Blood Vessels in Retinal Images Using Two-Dimensional Matched Filters," IEEE Transactions on Medical Imaging, IEEE Service Center, vol. 8, No. 3, Sep. 1, 1989, pp. 263-269, XP000053817.

Phan Trans Ho Truc, et al., "A New Approach to Vessel Enhancement in Angiography Images," Complex Medical Engineering, 2007, IEEE/ICME International Conference, May 1, 2007, pp. 878-884, XP031160059.

Thinh V. Nguyen, et al., "Computing the Skeleton of Coronary Arteries in Cineangiograms," Computers and Biomedical Research, Academic Press, London, GB, vol. 19, No. 5, Oct. 1, 1986, pp. 428-444, XP022956044.

(Continued)

*Primary Examiner* — Clayton E Laballe
*Assistant Examiner* — Leon W Rhodes, Jr.

(57) ABSTRACT

A method for detecting tubing in a radiographic image of a patient, executed at least in part by a control logic processor, obtains a radiographic image data for a patient and detects one or more possible tube segments in the image. At least one tubing candidate is formed by growing at least one detected tube segment or merging two or more detected tube segments.

18 Claims, 15 Drawing Sheets

OTHER PUBLICATIONS

European Search Report dated May 4, 2009 for European Patent Application No. 09000944.0 filed on Jan. 3, 2009, 3 pages.

Petr Dokládal, et al., "Liver Blood Vessel Extraction by a 3-D Topological Approach," MICCAI '99, Proceedings of the $2^{nd}$ International Conference on Medical Image Computing and Computer Assisted InterventionsLNCS, 1679, pp. 98-105, 1999.

Aaron K. Shackelford, et al., "Fully Automated Road Network Extraction from High-Resolution Satellite Multispectral Imagery," IEEE, 2003, pp. 461-463.

Iching Liu, et al., "Recursive Tracking of Vascular Networks in Angiograms Based on the Detection-Deletion Scheme," IEEE Transactions on Medical Imaging, vol. 12, No. 2, Jun. 1993, pp. 334-341.

\* cited by examiner

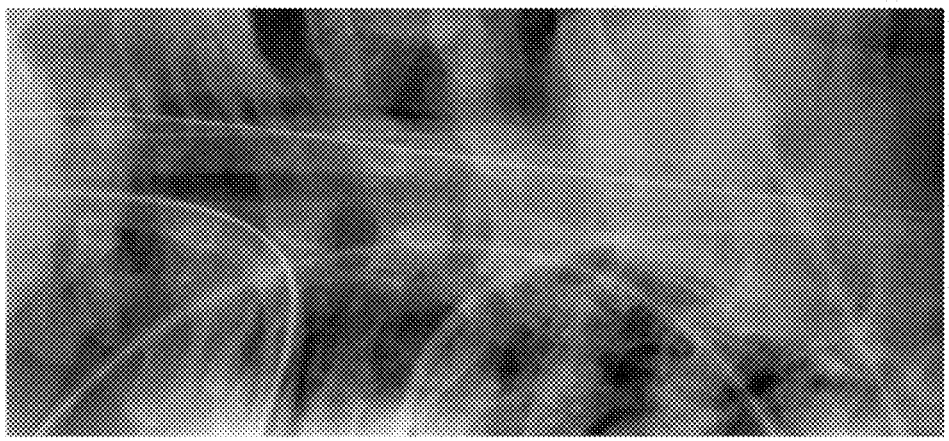

COMPUTER-AIDED TUBING DETECTION

CROSS REFERENCE TO RELATED APPLICATIONS

This is a Continuation of U.S. Ser. No. 12/172,283 entitled "COMPUTER-AIDED TUBING DETECTION", by Huo, filed Jul. 14, 2008 now U.S. Pat. No. 8,064,675, which claimed priority from U.S. Provisional Application No. 61/024,624 entitled "COMPUTER-AIDED INTERPRETATION OF ICU PORTABLE CHEST IMAGES: DETECTION OF ENDO-TRACHEAL TUBES" by Huo, filed on Jan. 30, 2008, and from U.S. patent application Ser. No. 11/942,021 entitled "IMAGE ANALYSIS OF TUBE TIP POSITIONING" by Huo, filed Nov. 19, 2007. All of the above are incorporated herein by reference in their entirety.

FIELD OF THE INVENTION

This invention generally relates to processing of diagnostic images and more particularly to processing that is performed in order to identify the position of an internal tube positioned within the patient.

BACKGROUND OF THE INVENTION

Portable X-ray radiographs are widely used in the Intensive Care Unit (ICU) for indicating significant or unexpected conditions requiring immediate changes in patient management. A single diagnostic image may show a condition that is related to treatment procedures, such as a collapsed lung or the proper or improper placement of tubing within the patient. A succession of diagnostic images, taken over a time period, may help to show the progress of a patient's condition and help to direct ICU treatment accordingly.

While portable radiography has advantages for ready accessibility, however, there are some difficulties that limit the accuracy and usefulness of diagnostic images obtained in the ICU. Differences in image quality from one image to the next can be significant, owing to differences in exposure settings, patient and apparatus positioning, scattering, and grid application. Even for successive images obtained from the same patient over a short treatment period, there can be substantial image quality differences between two or more images that complicate or even prevent effective comparison between them, thus constraining the ability of the clinician to detect subtle changes that can be highly significant.

An issue for patient care management relates to the ability to detect the proper positioning of tubing that has been inserted into the patient. This tubing includes, for example, endotracheal (ET) tubes, feeding tubes (FTs), and nasogastric tubes (NGTs), among others. Proper tube positioning can help to ensure delivery or disposal of liquids and air/gases to and from the patient during treatment. Improper tube positioning can cause patient discomfort or can render a treatment ineffective. In particular, because of poor image quality in portable anterior-posterior (AP) X-ray images, it is often difficult for a clinician to visually detect, with sufficient certainty, the position of the tube tip. Thus, there is a need for a diagnostic imaging method that helps to identify tubing and tube tip position.

SUMMARY OF THE INVENTION

It is an object of the present invention to address the need for improvements in automatic detection of tubing and tube tips. With this object in mind, the present invention provides a method for detecting tubing in a radiographic image of a patient, executed at least in part by a control logic processor, comprising: obtaining radiographic image data for a patient; detecting one or more possible tube segments in the image; and forming at least one tubing candidate by extending at least one detected tube segment or by merging two or more detected tube segments.

It is a feature of the present invention that it traces tubing contour by imaging techniques that grow outwards from an initial detected position of a possible tube segment.

The present invention adapts to different imaging apparatus and equipment, so that images taken at different times or on different imaging systems can be processed and compared.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIGS. 11A, 11B, and 11C show enhanced original ROI, tube segment detection before classification, and final tubing candidate detections after the classification step (false-positive removal step) for tubing detection as accomplished using an embodiment of the present invention.

DETAILED DESCRIPTION OF THE INVENTION

It is to be understood that elements not specifically shown or described may take various forms well known to those skilled in the art.

Reference is made to commonly assigned U.S. patent application Ser. No. 11/644/858 entitled "COMPUTER AIDED TUBE AND TIP DETECTION" by Huo, provisionally filed Nov. 21, 2006 and perfected Dec. 22, 2006, incorporated herein by reference.

The present invention provides a method for automated detection of tubing and tube tips from a radiographic image of a patient. The method of the present invention can be executed, at least in part, by a control logic processor, such as a computer, microprocessor, or other dedicated logic processing apparatus that has a processor-accessible memory for storing radiographic image data and that is associated with a display apparatus for display of a processed image having detected tubing. The method detects an initial set of one or more possible tube segments using different feature images of as many as two different types and utilizes growth and merging operations to form tubing candidates in an obtained image. In the description that follows, the method of the present invention is directed to detection and display of the ET tube and tip. Thus, for example, specific anatomy relevant for ET positioning is noted. However, it should be observed that similar steps, with appropriate anatomy used for reference, would apply for detection of other tubing types.

ET tubing is typically fabricated to have a radio-opaque strip that makes it easier to identify in the radiographic image. References in the following description to left and right "edge" refer to detection of the edge of the corresponding line that is generated from this radio-opaque strip, rather than to detection of the physical edge of the tubing itself.

Figure 1:
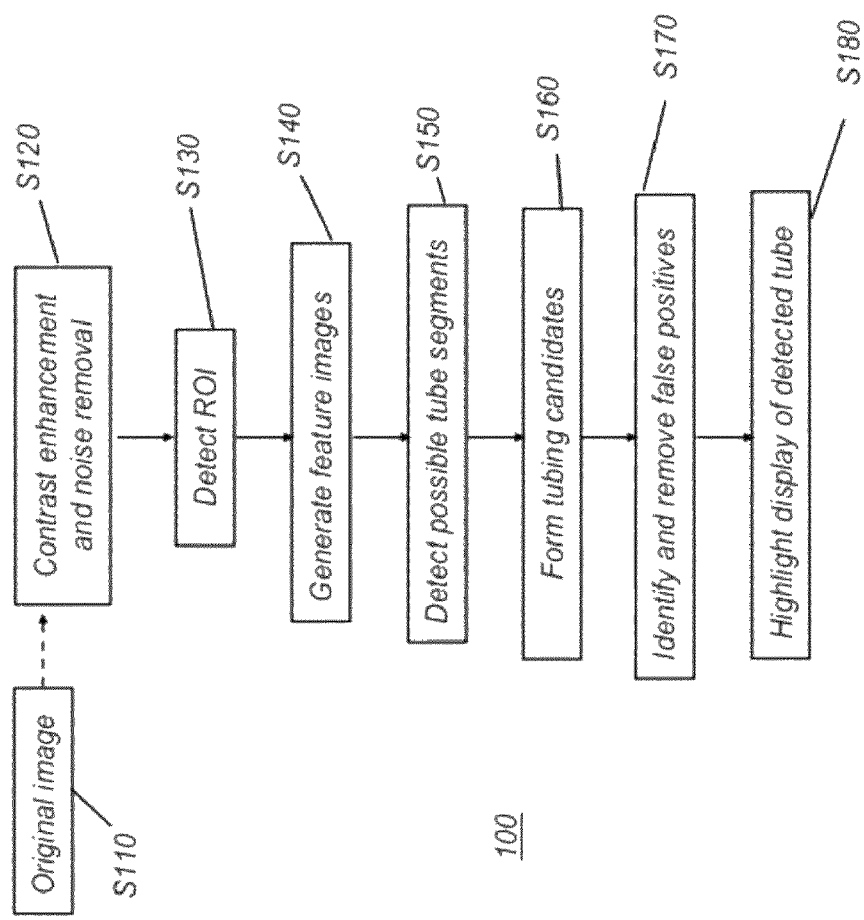
FIG. 1 is a logic flow diagram showing a basic sequence for tube and tip detection in embodiments of the present invention.

FIG. 1 is a flow diagram of a detection method 100 showing a basic sequence for tube and tip detection in embodiments of the present invention. In an obtain image step S110, the diagnostic image data for the patient is obtained, such as from a digital radiography (DR or CR) system or from a scanner, for example. An optional image processing step S120 can be helpful for performing any necessary cleanup and noise removal that might be helpful. This processing can include any suitable method for pre-processing of the image data, including histogram equalization to enhance the contrast of the grayscale image by transforming values using Contrast-Limited Adaptive Histogram Equalization (CLAHE), described in commonly assigned U.S. patent application Ser. No. 11/644/858, entitled "COMPUTER AIDED TUBE AND TIP DETECTION" by Huo et al.

An optional ROI detection step S130 follows, in which key anatomical structures within the Region Of Interest (ROI) for the tubing type are identified. This step, although optional, helps to reduce computation time by isolating the area of the image most likely to include the tubing of interest. For ET tube detection, ROI detection identifies the lung and spine regions, since the image of the ET tube is usually centered about the spine. The tip of the ET tube is generally about 3-5 cm above the carina, located between the two primary bronchi at the site of the tracheal bifurcation.

Figure 2C:
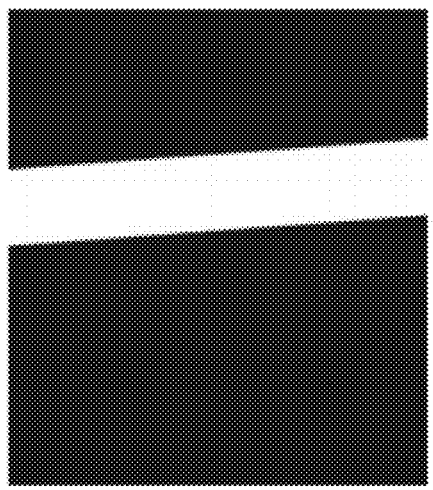
FIG. 2C is an image of a mask used for locating spine structure.
Figure 2B:
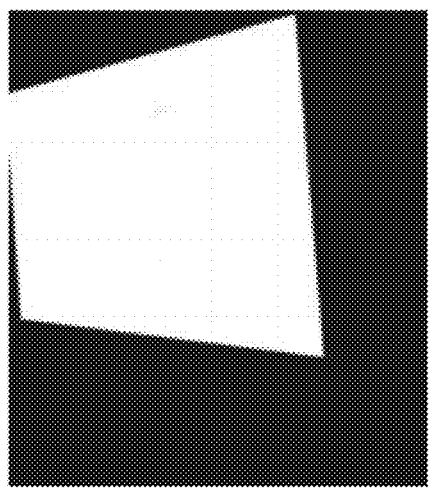
FIG. 2B is an image of a mask used for locating lung structures.
Figure 2A:
FIG. 2A shows an example of an x-ray image obtained on a portable radiography system.

By way of example, FIG. 2A shows a chest x-ray obtained at a portable radiographic imaging system. FIG. 2B shows a mask, here a simple polygon, that is used to coarsely identify the lung area. FIG. 2C then shows a mask that is used to further isolate the spinal chord. The combination of these masks can then be used to help locate the ROI.

Feature Images Generation

In an embodiment of the present invention, a feature images generation step S140 is executed on the ROI or on some portion or all of the full image (FIG. 1) for detecting possible tube segments. Feature images are enhanced template-processed images that are formed by processing image data content using one or more templates. In one embodiment, as many as three feature images are generated as template-processed images using angle-specific templates: (i) an enhanced tube-pattern feature template-processed image 40 obtained using an enhanced tube-pattern feature template; and (ii) two gradient or edge images obtained using gradient feature templates.

Using these three feature images with a properly defined ROI provides a tubing detection utility with an improved likelihood of success and with a lower false-positive error rate when compared against earlier automated techniques. Alternate embodiments use one or more feature images generated using either or both enhanced tube-pattern feature template (i) and gradient feature templates (ii).

Centered pattern enhancement tools are used in applications where local enhancement of an image along a line is needed. One type of centered pattern enhancement tool uses a Haar-like template or, more generally, an enhanced tube-pattern feature template that applies Haar wavelet processing, well known to those skilled in the image analysis arts. In more general image analysis applications, Haar wavelet processing provides a number of image processing tools, with various functions that include image information encoding and pattern and feature recognition, for example. Embodiments of the present invention adapt techniques similar to those used in Haar wavelet processing as centered pattern enhancement tools for enhancing tube-pattern features that can be utilized along with other imaging utilities for detecting possible tube segments. It can be observed that enhanced tube-pattern feature template-processed image 40 processing, with advantages for detail and pattern recognition, enhances different characteristics of the image than does image processing for enhancing edge gradients. Embodiments of the present invention can take advantage of either type of processing or of both types of enhanced template-processed images, with both pattern and gradient enhancement, combining the results of image processing for each type of image in order to obtain composite image data that can be successfully processed for tubing detection.

Figure 3:
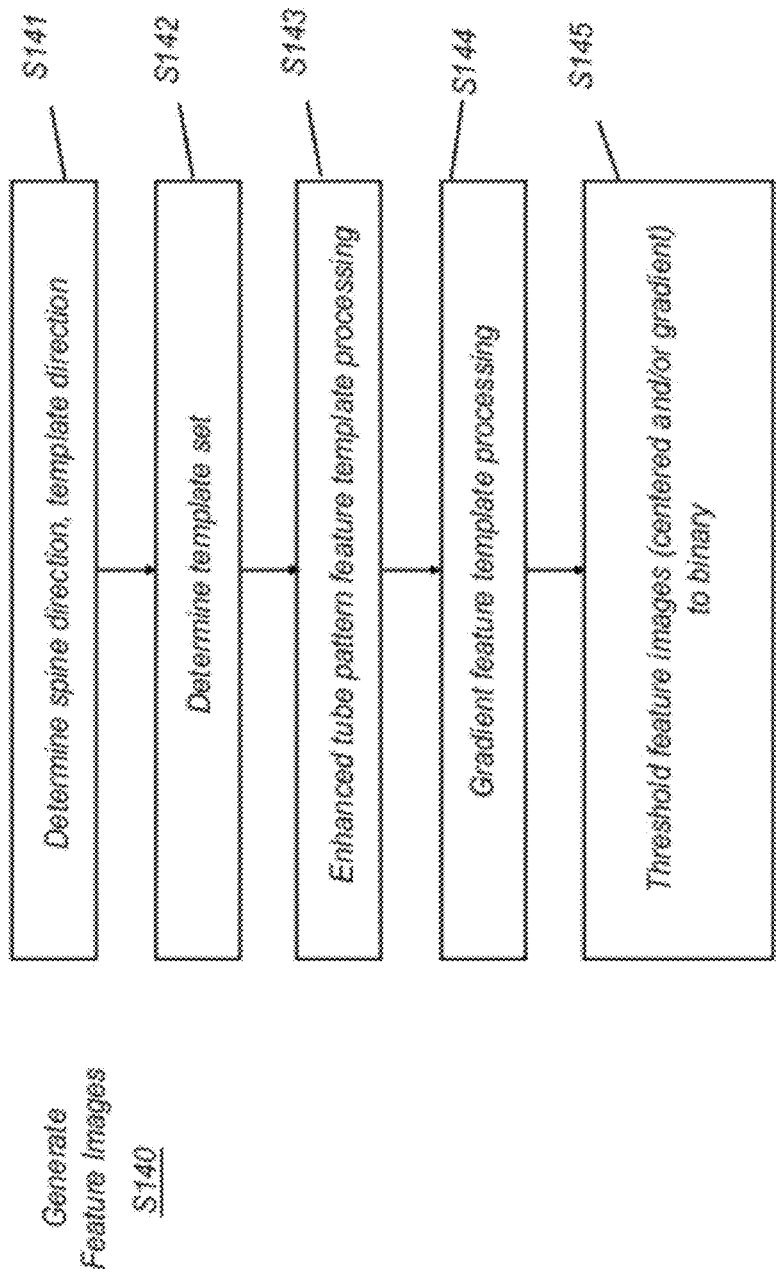
FIG. 3 is a logic flow diagram showing a process for obtaining threshold images in one embodiment.

The logic flow diagram of FIG. 3 shows a basic sequence for generating feature images in feature images generation step S140. A direction determination step S141 determines the direction of the spine or other surrounding anatomical structures and, based on this direction, determines a suitable template direction for the specified ROI. A template determination step S142 then identifies a suitable template. At least one of the optional enhanced tube-pattern feature template processing step S143 or optional gradient feature template processing step S144 follows, employing the direction information that is obtained earlier to generate suitable centered pattern enhancement and/or edge template processed images. A thresholding step S145 then provides the centered pattern and/or edge feature images as binary images for the next stage in processing.

Figure 4C:
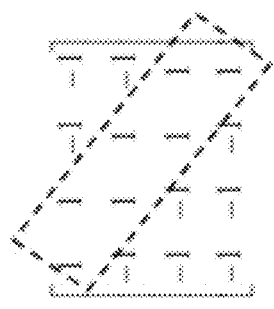
FIGS. 4C and 4D show enhanced tube pattern feature templates with orientation at other than vertical angles.
Figure 4D:
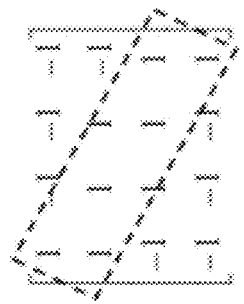
Figure 4A:
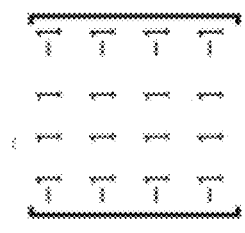
FIG. 4A shows an example of a matrix used for enhanced tube pattern feature template processing of an image.

An enhanced tube-pattern feature template-processed image 40 (listed as image (i) earlier) is generated by applying an enhanced tube-pattern feature template to the raw ROI or to an enhanced version of the raw ROI that was obtained in step S130 (FIG. 1). By way of example, FIG. 4A shows an enhanced tube pattern feature template as a matrix of $h_1 \times h_2$ size, where $h_1=h_2=4$. The angular orientation for kernel rotation parameter θ in this example is 0 degrees. Note that the number of the columns with values 1 and −1 in the kernel used for enhanced tube pattern feature template processing can be variable, determined based on the size and width of the tubing or other structure of interest.

Figure 4B:
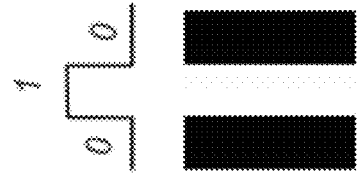
FIG. 4B shows an example FIG. representing the template data stored in an enhanced tube pattern feature template.

In one exemplary embodiment, a set of 8 enhanced tube-pattern feature templates of the same kernel size and of different angles ($θ_k=kπ/8$, k=−3, −2, −1, 0, 1, 2, 3, 4, $h_1=h_2=20$) are used for ET tube detection. FIG. 4B shows the image of one template (θ=0, $h_1=20$, $h_2=20$), where the white area represents 1 and the black area represents −1. The rest of the enhanced tube-pattern feature templates are rotated by the angle $θ_k$. FIGS. 4C and 4D show enhanced tube-pattern feature templates at other than vertical angles.

Figure 4F:
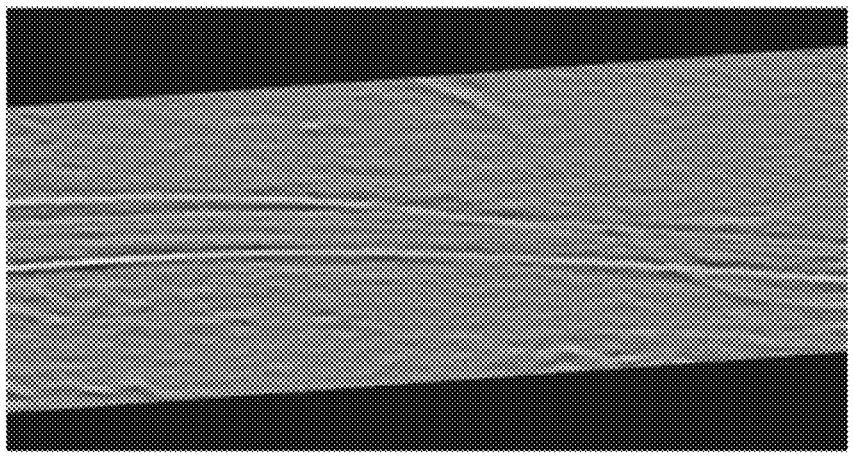
FIG. 4F shows the results of enhanced tube pattern feature template processing on the ROI of FIG. 4E.
Figure 4E:
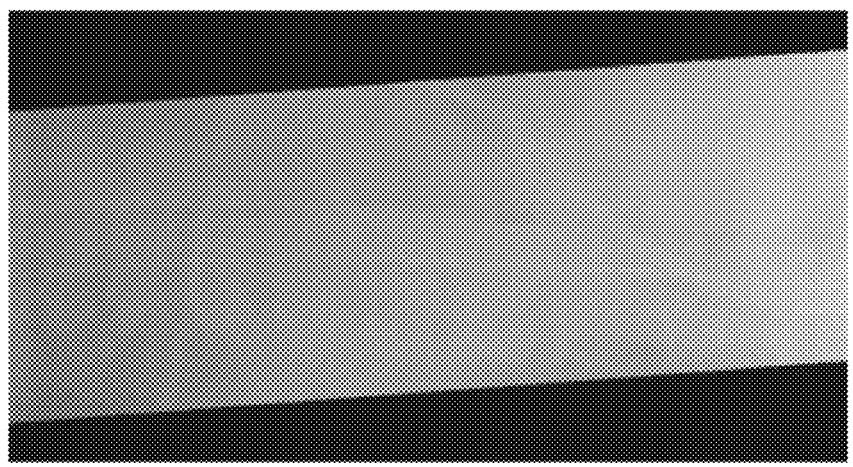
FIG. 4E shows a region of interest (ROI) of the larger image.

In an embodiment, one enhanced tube-pattern feature template-processed image from the set is selected for each ROI. For ET tubing detection, the template whose angle θ is most similar to the direction of the detected spine for a given image is generally preferred. For the given example in FIG. 2A, FIG. 4E shows the selected ROI. FIG. 4F shows the corresponding enhanced tube-pattern feature template-processed image that results from this processing. As can be seen from this example, tubing structures that are barely noticeable in the original image are much more pronounced in the image that is generated using the enhanced tube-pattern feature template.

As noted earlier, an embodiment of the present invention identifies tubing structures by combining the results obtained from the optional enhanced tube-pattern feature template processing (part (i), above) with those obtained using optional gradient feature template image processing (part (ii), above). For generating optional gradient or edge images, another type of template is applied. The example of FIG. 5A shows a gradient feature template that can be used for processing that detects the left edge of the radio-opaque tubing line, as shown in FIG. 5B. The example of FIG. 5C then shows a gradient feature template that can be used for processing that detects the right edge of the radio-opaque tubing line, as shown in FIG. 5D. For both of these templates, the size ($h_1 \times h_2$) of the kernel is a factor of the size and width of the tubing line of interest. Here, the kernel size of $h_1=5$, $h_2=6$ is used. The angle θ ($θ_k=kπ/8$, k=−3, −2, −1, 0, 1, 2, 3, 4) for generating the gradient or edge image is determined based on the direction of the detected spine. Again, the template whose angle θ is most similar to the direction of the detected spine for a given image is preferred.

Figure 5E:
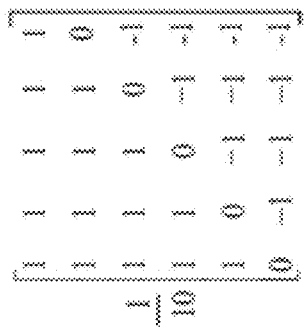
FIG. 5E shows a gradient feature template at a non-vertical angle.
Figure 5F:
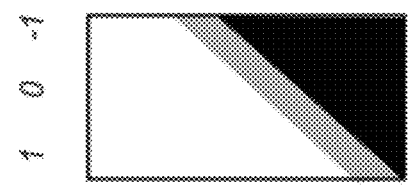
FIG. 5F shows an example FIG. representing the template data stored using a gradient feature template with a non-vertical template angle, as in FIG. 5E.
Figure 5C:
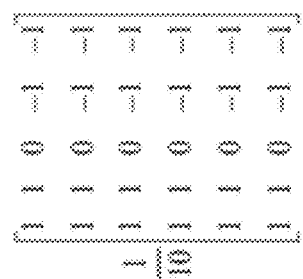
FIG. 5C shows a 5×6 kernel used for edge detection as a gradient feature template in an alternate embodiment, for detecting the opposite edge from that detected by the template shown in FIG. 5A.
Figure 5D:
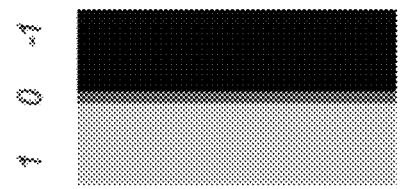
FIG. 5D shows an example gray scale image representing the gradient feature template corresponding to FIG. 5C.
Figure 5A:
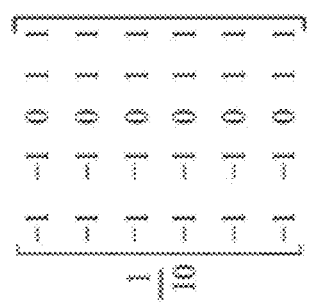
FIG. 5A shows a 5×6 kernel used for edge detection as a gradient feature template in one embodiment.
Figure 5B:
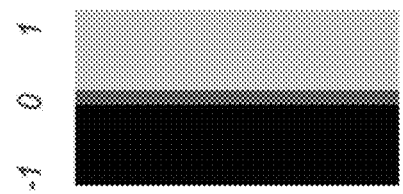
FIG. 5B shows an example gray scale image representing the gradient feature template corresponding to FIG. 5A.
Figure 5G:
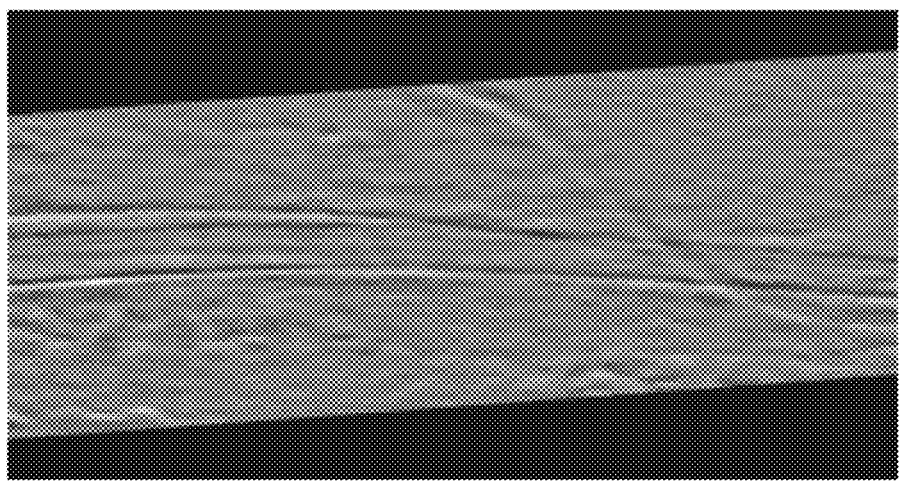
FIG. 5G shows one example of the results of gradient feature template processing on the ROI.

FIG. 5E shows a gradient feature template at a non-vertical angle, as shown in FIG. 5F. The example of FIG. 5G shows gradient detection using an angle $θ=π/4$ and $h_1=13$, $h_2=20$.

Figure 6:
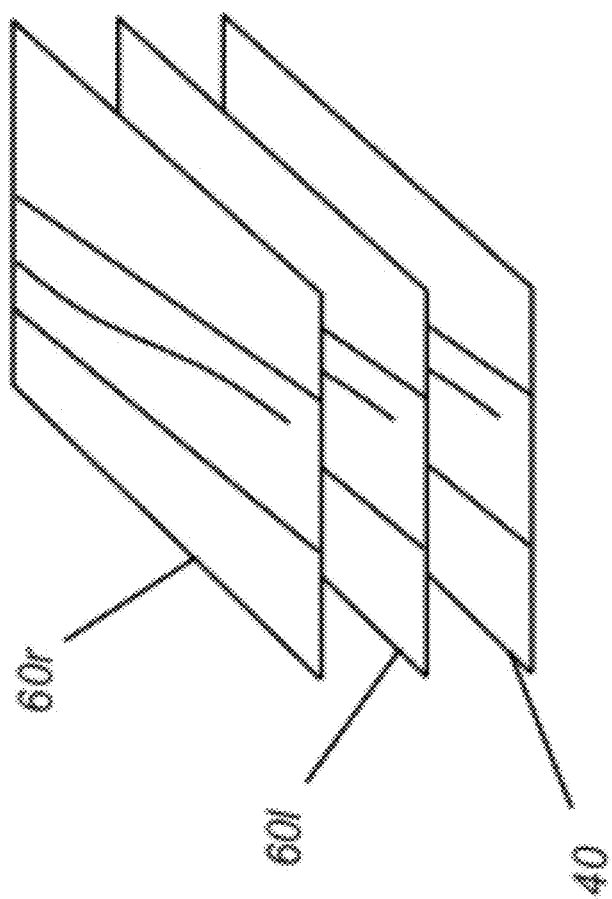
FIG. 6 is a block diagram showing combination of the feature images in order to obtain an image for analysis.

FIG. 6 shows graphically how as many as three images obtained in steps (i) and (ii) described earlier are used for tubing detection. A composite image set is formed from enhanced tube-pattern feature template-processed image 40, left-edge gradient image 60l, and right-edge gradient image 60r. In this way, results from centered-pattern enhancement and gradient image processing are effectively added to each other, enabling the resulting image data to show likely tubing structures in a manner that is more sensitive and robust than other techniques show.

A thresholding step S145 (FIG. 3) assigns a binary value to each point in either enhanced tube-pattern feature template-processed image 40 or gradient image 60l or 60r, or in both types of images according to a predetermined threshold value. In one embodiment, the threshold for this purpose is set at 1.7% of the maximum value. All pixel values below this threshold are assigned one (dark) value; all pixel values at or above the threshold are assigned another value. The composite image set of FIG. 6 can be generated before or after the thresholds applied to the enhanced tube pattern feature template-processed image 40 and gradient images 60l, 60r.

Possible Tube Segment Detection

In detection of possible tube segments, the paired left and right edges on the gradient images correspond to the left and right edges of the radio-opaque stripe in the tube and are thus considered as identifying possible tube segments. The search proceeds by checking along each line of pixels between paired left and right edges for the point that has the maximum centered-pattern enhancement value. The points with maximum values in between the paired left and right edges correspond to center points of the tube segment.

Figure 7:
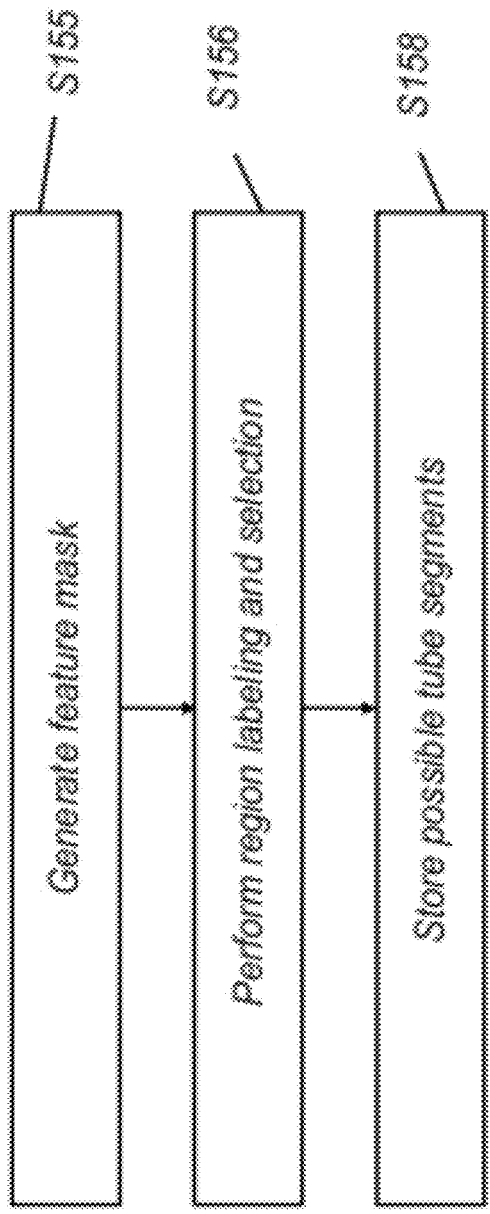
FIG. 7 is a logic flow diagram showing a sequence for possible tube segment detection.

Referring back to the logic flow diagram of FIG. 1, once the feature image, whether either or both enhanced tube-pattern feature template-processed image 40 and gradient images 60l and 60r, is obtained in step S140, a possible tube segment detection step S150 can be carried out. The more detailed block diagram of FIG. 7 shows the sequence for possible tube segment detection step S150 in one embodiment.

In a generate feature mask step S155, a feature mask is formed. To do this in one exemplary embodiment:

1.) For each line of the image, a local maximum is obtained. This can be a maximum on each of the left- and right-edge images, where these have been generated.

2.) The local maximum of the enhanced tube-pattern feature template-processed image, lying between the edges detected in the left and right images, is determined.

3.) Possible tube segments are identified using a correspondence of enhanced tube-pattern feature template-processed image and gradient feature template processing. To do this processing, a pair of suitable left- and right-edge image points on a line that are appropriately distanced from each other are identified. Pixels that lie between the two edges on the line are identified and can be grouped to define possible tube segments for tube detection, based on a detection sequence that checks for the maximum centered-pattern enhancement value lying between these points.

4.) Perform a closing operation on the mask, such as using a 5×1 kernel operation, for example.

In an alternate embodiment, possible tube segments are identified using separate processing results from only the enhanced tube-pattern feature template or using only one or two of the gradient feature templates. Combining results from these individual feature templates, however, may have particular advantages for identifying possible tube segments for some type of images.

Continuing with the sequence of FIG. 7, once possible tube segments are identified, a region labeling and selection step S156 is then executed on feature mask results. Region labeling is a binarization process that helps to identify tubing characteristics for possible tube segments or patches that meet or exceed a minimum threshold. This step examines each part identified using the feature mask. Region labeling connects the points of detected possible tube segments using a suitable technique, such as four-point connectivity checking, for example. Where the width is 0, a pair of edges has not been detected. The corresponding possible tube segment is rejected. Any detected initial possible tube segments are then stored for further processing in a storage step S158.

Figure 8B:
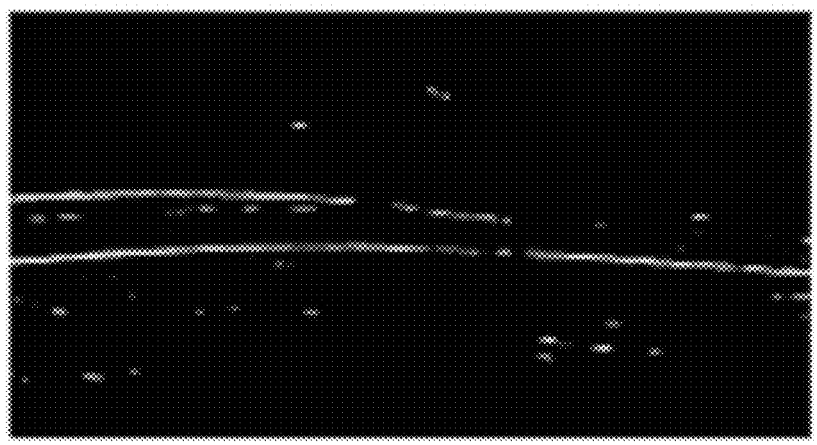
FIG. 8B shows a threshold image obtained by processing the enhanced tube-pattern-feature template-processed image of FIG. 6A.
Figure 8A:
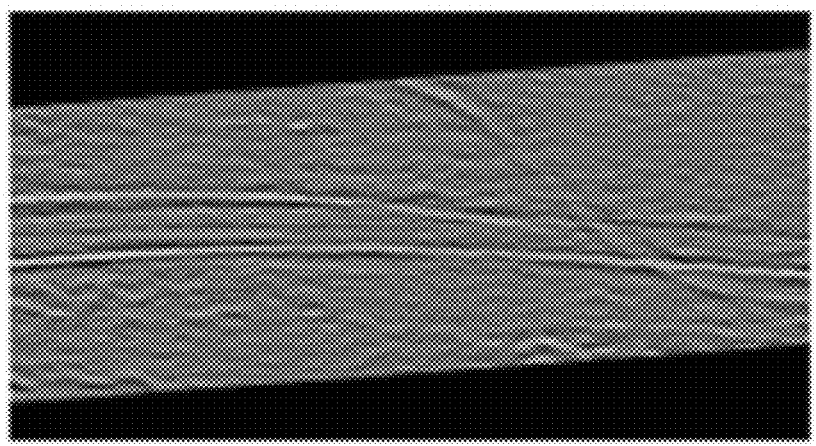
FIG. 8A shows an enhanced tube-pattern-feature template-processed image.

FIGS. 8A and 8B compare an edge image to the resulting threshold image obtained using initial possible tube segment detection according to the present invention.

Tube Enhancement and Merging to form Tubing Candidates

Referring back to FIG. 1, a tube enhancement and merging step S160 follows, in which, to form a primary tubing candidate, a possible tube structure is extended and merged with other candidate sections. The logic flow diagram of FIG. 9 lists steps that are used for tube enhancement and merging step S160 in one embodiment. FIG. 10 then shows a series of images for tube enhancement and merging step S160 in ET tube detection for an ROI 30. In FIG. 10, tube enhancement results are shown relative to an enhanced tube pattern feature template-processed image 40. The tubing growth that is shown as a tube segment 42 with tubing growth indicated at 44 and 46 extends upward (in terms of the orientation shown). The tubing growth shown at 48 and 50 begins to extend downward.

In one embodiment, tube enhancement involves linear line or curve (second and third polynomial) fitting of each detected tube segment for forming a tubing candidate, using methods familiar to those skilled in mathematical curve-fitting techniques. These initial possible tube segments are usually in the form of broken lines or patches. As shown in the sequence of FIG. 10, enhancement starts from both ends of the broken lines, extending along the direction of the fitted line or curve. The tube enhancement algorithm first searches for a predefined number of points along the fitted line or curve at both ends. If a fraction of these points meet a minimum value set on the enhanced tube pattern feature template-processed image 40, these points become part of the initial tube, and another set of points along the fitted line are then examined. The search continues until a new set of points fails to meet the criteria.

Figure 9:
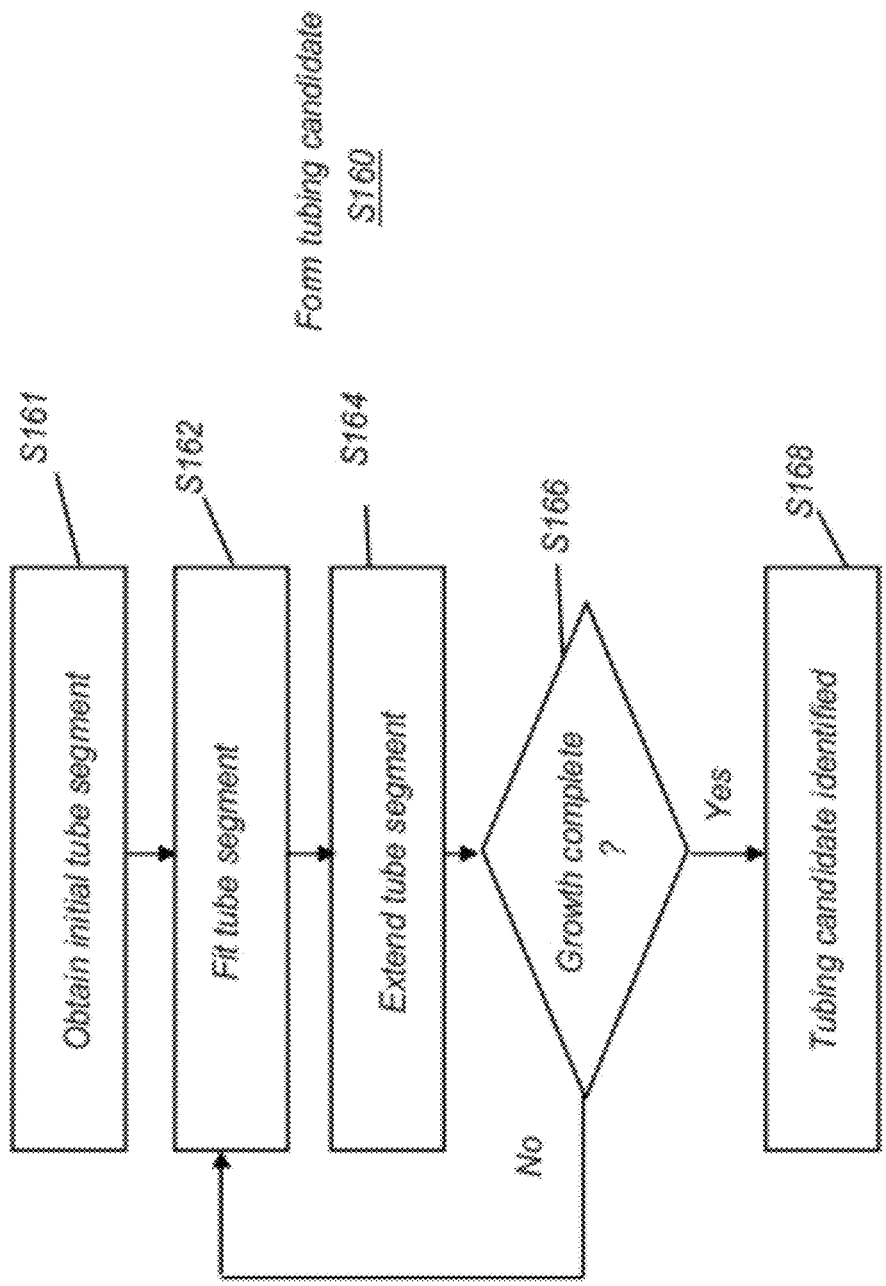
FIG. 9 is a logic flow diagram for the processing needed for tube enhancement and merging.
Figure 10:
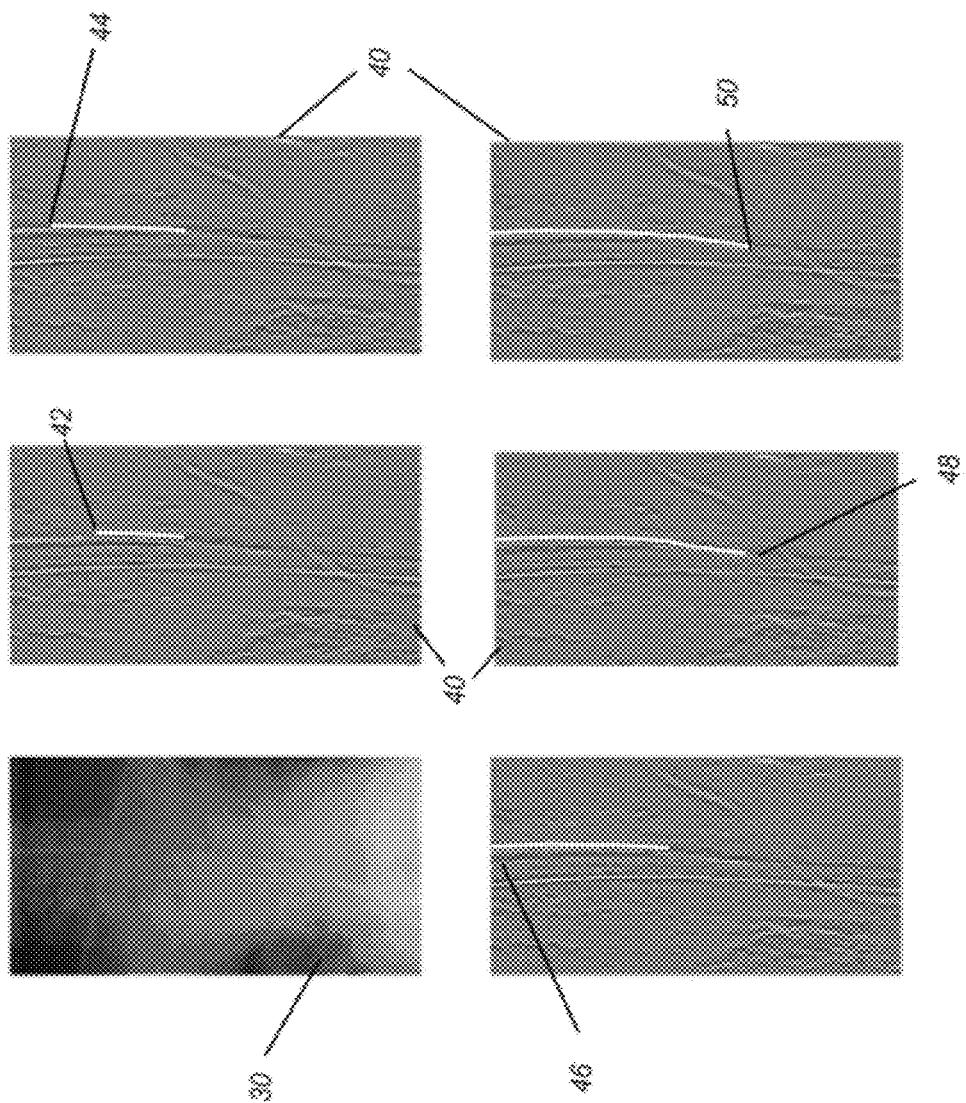
FIG. 10 shows a representative ROI image and a sequence of enhanced tube-pattern feature images showing the progress of a tubing-growth algorithm.

In the logic flow of FIG. 9, an initialization step S161 begins by obtaining one of the initial possible tube segments that had been identified in step S150. For each possible tube segment, the points in each row of pixels that have a maximum centered pattern enhancement value are identified and used as the tube center point set S. The corresponding value of these center points in the centered pattern enhancement from enhanced tube pattern feature template-processed image 40 is denoted as set V.

A fitting step S162 is then executed in order to fit the possible tube segment to a $3^{rd}$-order polynomial curve, such as a curve conforming to enhanced tube pattern feature template-processed image 40 (FIG. 10). This sequence is carried out as follows in one embodiment:

1) The x,y position of each point in set S is fitted to a $3^{rd}$-order polynomial fitting curve in a fitting step S162.

2) The possible tube segment is extended along this fitting curve in an extension step S164. For this step, the possible tube segment is extended along the fitting curve in increments. In one embodiment, the increment is the lesser of 30 pixels or ⅓ of the identified initial possible tube segment length. The extended point set is labeled E.

3) Check for completion of growth or continue. A test step S166 is then executed in order to determine whether or not growth can continue from the extended tube segment. For test step S166, a binary sequence Seq for the enhanced tube segment is generated and used as follows:

3a) Point set E's corresponding value in the enhanced tube pattern feature template-processed image 40 is denoted as $V_E$. For any point Q in set E, the following assignment of a binary value is made:

$$\text{if } \frac{V_e}{Avg(V)} > 0.05 \text{ set } Q \text{ to } 1$$

$$\text{else, set } Q \text{ to } 0.$$

This creates a binary sequence Seq of 1s and 0s corresponding to this centered pattern enhancement content for set E.

3b) If Seq begins with 1 for set E, such as $$\underset{t_k}{1}1111000001\underset{t'_k}{1}111001$$

(where $t_k$ denotes the start position of the binary sequence and $t'_k$ denotes the position before first zero), then add the points between $t_k$ and $t'_k$ to set S. Reassign $t_k = t'_k$. Return to the beginning of step 3).

3c) If Seq begins with 0, such as $$\underset{t_k}{0}011111\underset{t'_k}{0}000011001$$

(where $t_k$ denotes the start position of the binary sequence. $t'_k$ denotes the position before the first 0 that occurs after 1), if in $t_k < t \leq t'_k$, the total number of zeros is greater than a given threshold $T_N$, stop the enhancement process in a termination step S168. Otherwise, add the points in $t_k < t \leq t'_k$ to set S, assign $t_k = t'_k$, and return to the beginning of step 3). Threshold $T_N$ is assigned as 16 in one embodiment.

Merging of tube segments to form a tubing candidate can be performed in a fairly straightforward manner. After fitting two tube segments having overlapping rows of pixels, the mean fitting difference between the two fitting curves is computed. Where this mean value is smaller than an empirically determined constant c, the two tube segments can be merged.

Two nearby tube segments may not have any overlap rows. In such a case, after fitting the two tube segments, if the mean fitting difference in those rows between two tube segments is smaller than an empirically determined constant c and the centered pattern enhancement mean value in these rows exceeds a second predetermined threshold value, the tube segments can be merged together.

Note that the sequence just described for tube enhancement and merging shows one of a number of possible embodiments. Methods that allow incremental growth and continual testing, such as the sequence just described, are advantaged over other possible methods for linking identified possible tube segments to form a tubing candidate.

Feature Extraction for Removing False Positives

Referring again to the flow chart of FIG. 1, a false-positive removal step S170 follows tube enhancement and merging step S160. For each identified tubing candidate, features such as the width, variation in width, length of the detected tubing candidate, and tube position relative to other anatomy structures such as lung and spine are calculated. In addition, statistics from the analysis of the detected tube lines, such as mean curvature, standard deviation, and the variation in curvature of the fitted line can be calculated. In one embodiment, a total of seven features are calculated for each tubing candidate. Tip position and tube width standard deviation can also be used to help detect and eliminate false positive tubing candidates.

Among features that have been found to be particularly useful for ET tube classification are tube width, 1-degree fitting error, 3-degree fitting error, tube/spine angle difference, mean value at tube, tube width and position, and tube percentage in initial regions, that is, percentage of pixels initially determined to be part of a tubing structure. Other features could similarly be extracted and used for false-positive removal. In one embodiment, linear and quadratic discriminant analysis methods (QDA) are employed to analyze these features for differentiating true-positive from false-positive tubing detections.

Figure 11B:
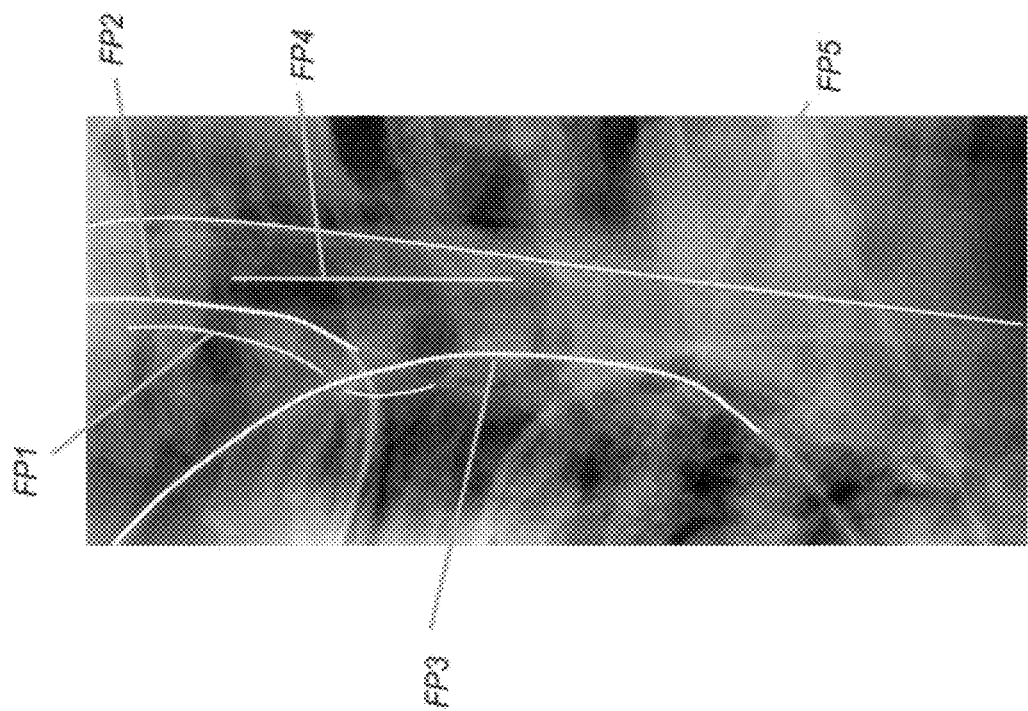
Figure 11C:
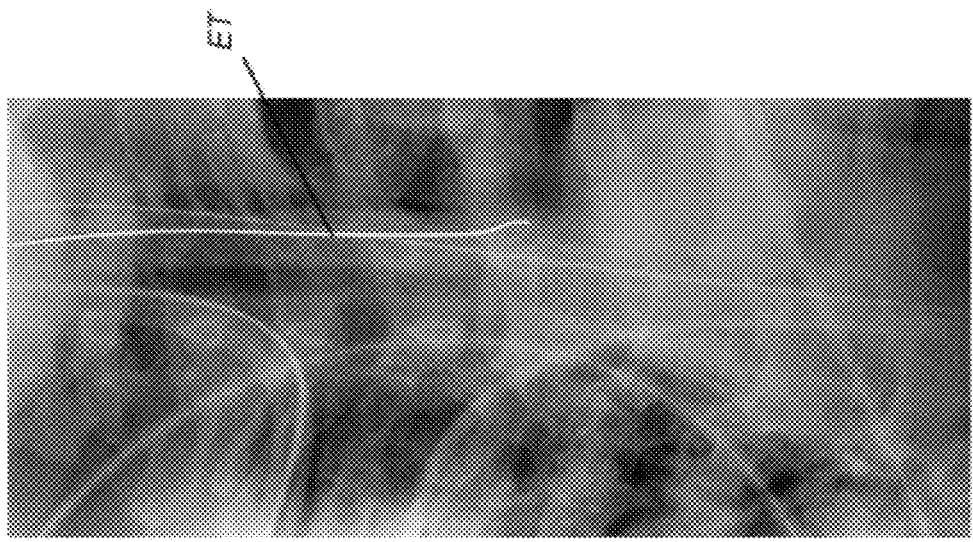

FIGS. 11A through 11C show the original image, results of initial tubing candidate detection, and final results for an ET tube detection sequence in one embodiment of the present invention. In FIG. 11B, a number of false positive tubing candidates can be identified, labeled FP1, FP2, FP3, FP4, and FP5. It can be seen from this example that characteristics such as curvature and overall position can be useful for eliminating a percentage of these false positives. At least significant portions of false positives FP1, FP2, and FP3 are poorly positioned, which can be detected in a straightforward manner using the detectable location of spine and other anatomical structures. Moreover, false positives FP1, FP2, and FP3 also exhibit significant amounts of curvature, more than would be anticipated for ET tubing. False positive FP1 shows variation in curvature, making it a particularly unlikely candidate. False positives FP4 and FP5 have better position and reduced curvature, but fail for other reasons. False positive FP4 appears to be too short and is not connected with other tubing that leads further upward or downward. False positive FP5 has excessive length, extending well past the carina in this example. For these reasons, each of false positives FP1-FP5 can be removed from consideration.

Once false-positive tubing candidates have been identified and discarded, the image of the detected tubing can be highlighted in the display that is presented to the viewer of the x-ray images, such as on a high-resolution display screen. FIG. 11C shows the successful detection of ET tubing for this example. The section of ET tubing for this patient, detected following the classification of false positives in steps just described, appears to have suitable condition, thickness, curvature, and other features. Highlighting of the detected tubing can be performed in a display highlighting step S180. As part of this step, color can be used to outline or otherwise highlight the display of tubing obtained using the steps shown in FIG. 1.

The method of the present invention has been shown to yield favorable results for tube and tip detection over other methods. Improved tubing discrimination with this method also results in a reduced number of false-positive readings. With one sample set of test images, quadratic discriminant analysis for false positive detection, applied using the general sequence described, obtained a reduction in the number of false-positives without measurable sensitivity loss. Results showed a sensitivity of 92% at 1.5. FPs/image. Earlier methods had achieved approximately 80% sensitivity at the same relative number of false positive per image.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, as noted earlier, any of a number of different methods could be used for ROI detection, including the use of earlier tube detection results for the same patient, for example. A single edge image could be obtained and analyzed and used for storing both left- and right-edge content.

Thus, what is provided is a method for enhancing diagnostic images in order to detect the position of tubes positioned within the patient.

PARTS LIST

30. ROI
40. Enhanced tube pattern feature template-processed image
42. Tube segment
44, 46, 48, 50. Tubing growth
60$r$, 60$l$. Gradient image
100. Detection method
S110. Obtain image step
S120. Image processing step
S130. ROI detection step
S140. Feature images generation step
S141. Direction determination step
S142. Template determination step
S143. Enhanced tube pattern feature template processing step
S144. Gradient feature template processing step
S145. Thresholding step
S150. Candidate detection step
S155. Feature mask generation step
S156. Region labeling and selection step
S158. Storage step
S160. Tube enhancement and merging step
S161. Initialization step
S162. Fitting step
S164. Extension step
S166. Test step
S168. Termination step
S170. False positive removal step
S180. Display highlighting step
FP1, FP2, FP3, FP4, FP5. False positives

The invention claimed is:

1. A method for detecting tubing in a radiographic image of a patient, comprising:
obtaining a radiographic image for a patient;
detecting at least one tube segment in the image; and
forming at least one tubing candidate by growing the at least one detected tube segment by identifying a group of consecutive pixels along a fitted curve of the detected tube segment.

2. The method of claim 1 further comprising extracting one or more features to characterize the at least one tubing candidate.

3. The method of claim 2 further comprising analyzing extracted features to remove one or more false-positive tubing candidates.

4. The method of claim 3 wherein analyzing extracted features to remove one or more false-positive tubing candidates comprises analyzing one or more of curvature, length, position relative to patient anatomy, detected tip position, and tube width standard deviation using quadratic discriminate analysis.

5. The method of claim 2 wherein extracting one or more features comprises identifying a feature taken from the group comprised of tubing candidate width, 1-degree and 3-degree errors from curve-fitting of the at least one tubing candidate, tube/spine angle difference, mean value at the tubing candidate, angular position of the tubing candidate, percentage of tubing candidate pixels within a fitted curve, length of the detected tubing candidate, tubing candidate position relative to one or more anatomy structures, mean curvature of the tubing candidate, and the variation in curvature of the tubing candidate.

6. The method of claim 1 further comprising identifying a region of interest in the image for detection of tube segments.

7. The method of claim 1 wherein detecting at least one tube segment comprises:
   forming at least one template-processed image by processing at least a portion of the radiographic image data using one or more gradient feature templates or using an enhanced tube pattern feature template; and
   applying an image thresholding algorithm to the at least one template-processed image, forming a thresholded image thereby.

8. The method of claim 7 wherein the one or more gradient feature templates are selected according to an angular orientation of the patient's spine.

9. The method of claim 7 wherein the enhanced tube pattern feature template is selected according to an angular orientation.

10. The method of claim 7 wherein the enhanced tube pattern feature template is a Haar-like template.

11. The method of claim 7 wherein forming at least one template-processed image further comprises treating the image content using thresholding.

12. The method of claim 1 wherein detecting at least one tube segment comprises using a gradient feature template to identify one or more edges of the tube segment and using an enhanced tube pattern feature template to identify a center of the tube segment.

13. The method of claim 1 further comprising performing contrast enhancement on the radiographic image.

14. The method of claim 1 further comprising displaying the at least one tubing candidate.

15. The method of claim 14 wherein displaying the at least one tubing candidate comprises highlighting the at least one tubing candidate on a display screen.

16. The method of claim 1 wherein growing the at least one detected tube segment comprises merging two or more detected tube segments according to a distance between the two or more detected tube segments.

17. The method of claim 1 wherein detecting at least one tube segment comprises
   processing at least a portion of the radiographic image data using at least one gradient feature template or using an enhanced tube pattern feature template, forming at least one template-processed image thereby;
   applying a thresholding algorithm to the at least one template-processed image; and
   identifying an edge or center pattern within the at least one template-processed image.

18. The method of claim 1 wherein growing is based on the analysis of thresholded template-processed images.

* * * * *